United States Patent
Kim

(10) Patent No.: US 6,712,886 B2
(45) Date of Patent: Mar. 30, 2004

(54) AIR PURIFICATION DEVICE FOR AUTOMOBILE WITH OXYGEN-SUPPLYING FUNCTION

(76) Inventor: Oh-Young Kim, K.P.O. Box 230, Seoul 110-602 (KR)

(*) Notice: Subject to any disclaimer, the term of this patent is extended or adjusted under 35 U.S.C. 154(b) by 0 days.

(21) Appl. No.: 10/341,787

(22) Filed: Jan. 14, 2003

(65) Prior Publication Data

US 2003/0131732 A1 Jul. 17, 2003

(51) Int. Cl.[7] ............................................. B01D 53/053
(52) U.S. Cl. ........................... 96/111; 96/115; 96/130; 96/134; 96/143; 96/222; 96/223
(58) Field of Search ..................... 55/385.3; 95/96, 95/101, 102, 130; 96/111, 115, 117, 130, 134, 135, 143, 144, 222, 223

(56) References Cited

U.S. PATENT DOCUMENTS

| | | | | |
|---|---|---|---|---|
| 2,811,221 A | * | 10/1957 | Mangold et al. | 96/111 |
| 3,880,616 A | * | 4/1975 | Myers et al. | 95/26 |
| 4,065,262 A | * | 12/1977 | Petroff | 96/222 |
| 4,144,037 A | * | 3/1979 | Armond et al. | 95/95 |
| 4,144,038 A | * | 3/1979 | Armond | 95/95 |
| 4,349,357 A | * | 9/1982 | Russell | 95/26 |
| 4,698,075 A | * | 10/1987 | Dechene | 96/116 |
| 4,813,977 A | * | 3/1989 | Schmidt et al. | 95/102 |
| 4,902,309 A | * | 2/1990 | Hempenstall | 95/95 |
| 5,266,102 A | * | 11/1993 | Gaffney et al. | 95/103 |
| 5,370,728 A | * | 12/1994 | LaSala et al. | 95/101 |
| 5,547,636 A | * | 8/1996 | Vick et al. | 422/124 |
| 5,656,067 A | * | 8/1997 | Watson et al. | 95/101 |
| 5,893,944 A | * | 4/1999 | Dong | 96/114 |
| 5,912,426 A | * | 6/1999 | Smolarek et al. | 96/115 |
| 5,928,407 A | * | 7/1999 | Amlinger | 95/21 |
| 6,063,169 A | * | 5/2000 | Cramer et al. | 96/112 |
| 6,096,115 A | * | 8/2000 | Kleinberg et al. | 95/101 |
| 6,146,447 A | * | 11/2000 | Sircar et al. | 95/101 |
| 6,290,759 B1 | * | 9/2001 | Fenner et al. | 96/130 |
| 6,346,139 B1 | * | 2/2002 | Czabala | 95/130 |
| 6,402,812 B1 | * | 6/2002 | Perrotta et al. | 95/95 |
| 6,478,850 B1 | * | 11/2002 | Warren | 95/21 |
| 6,478,857 B2 | * | 11/2002 | Czabala | 96/130 |
| 6,558,451 B2 | * | 5/2003 | McCombs et al. | 95/98 |
| 2003/0084789 A1 | * | 5/2003 | Kim | 96/121 |

FOREIGN PATENT DOCUMENTS

| | | |
|---|---|---|
| KR | 1020010056065 | 7/2001 |
| KR | 1020010057308 | 7/2001 |

* cited by examiner

Primary Examiner—Robert H. Spitzer
(74) Attorney, Agent, or Firm—Duane Morris LLP

(57) ABSTRACT

An air purification device has an oxygen-supplying function, in which air in an automobile is sucked by a vacuum pump and purified by a dust collector or an adsorbent such as activated carbon and zeolite, and oxygen is enriched in air to supply oxygen enriched air into the automobile. The air purification device enriches oxygen in air according to a VSA (vacuum swing adsorption) process using a difference between pressure in the adsorption bed and atmospheric pressure, in which nitrogen adsorbed into the adsorbent is release using the vacuum pump. The air purification device has an air filter for removing impurities from air sucked from an inside of the automobile by the vacuum pump, an adsorbent for adsorbing nitrogen from air passing through the air filter and passing oxygen, and an oxygen tank for storing oxygen supplied from the adsorbent and releasing oxygen using a vacuum.

13 Claims, 1 Drawing Sheet

AIR PURIFICATION DEVICE FOR AUTOMOBILE WITH OXYGEN-SUPPLYING FUNCTION

BACKGROUND OF THE INVENTION

1. Field of the Invention

The present invention relates, in general, to an air purification device with oxygen-supplying function and, in particular, to an oxygen supplier and an air purification device useful in indoor air conditioners or automobiles.

2. Description of the Prior Art

As well known to those skilled in the art, traditional examples of a process of supplying oxygen into the passenger compartment of an automobile include a pressure swing adsorption (PSA) process using an adsorbent such as zeolite and a process using a gas separation membrane. The PSA process is applied to supply oxygen enriched air with oxygen purity of 80% or higher, and the gas separation membrane process is used to yield oxygen enriched air with relatively low purity oxygen of 30% or higher. The gas separation membrane process usually requires a higher pressure than the PSA process.

However, these conventional processes, in which oxygen is separated from air using compressed air, are disadvantageous in that an adsorbent usually used in the PSA process, for example, a synthetic zeolite, absorbs moisture due to a vapor condensation phenomenon occurring when high temperature and pressure air compressed by an air compressor comes in contact with relatively cool room air, thereby reducing oxygen separation efficiency. In addition, the gas separation membrane process is disadvantageous in that: oxygen separation efficiency is reduced by moisture, like the PSA process; a lubricant in the air compressor is mixed with compressed air in the case of using an oil lubricating type air compressor having greater durability, and durability of the air compressor is poor in the case of a non-lubricating type air compressor; air compression is limited; a temperature of the air compressor is excessively high; and power consumption is large in the case of a motor type compressor using an automobile electric power source.

In other words, air is compressed to two to four atm of pressure and then supplied into an adsorption bed, and nitrogen adsorbed by the adsorbent in the adsorption bed is desorbed under atmospheric pressure in the case of the pressure swing adsorption process. This conventional process using the air compressor has disadvantages of serious noise pollution, poor durability and excessive power consumption when used in an automobile.

A traditional oxygen supplier for automobiles is a device in which atmospheric air is sucked to separate a small quantity of oxygen from air and oxygen is supplied into the automobile, and a separate air purification device is needed so as to purify air in the automobile.

A vacuum swing adsorption (VSA) process of generating oxygen enriched air with the use of an adsorbent by generating a pressure difference using a vacuum pump, not using the air compressor, has been used to generate oxygen enriched air in great quantities for a long period, in which atmospheric air passes through an adsorption bed under atmospheric pressure, and nitrogen adsorbed in the adsorption bed is desorbed by creating a vacuum in the adsorption bed. The VSA process is advantageous in that noise pollution is reduced, and disadvantages of the PSA process occurring in the case of using an oil lubricated device are avoided. However, this VSA process can only be applied to not a small-scale oxygen generation process but a large-scale commercial oxygen generation process. In the case of being used in the small-scale oxygen generation process, the VSA process is used in combination with PSA process, that is to say, in the form of a VPSA combination process to increase productivity and purity of oxygen enriched air. An example of such VPSA combination processes using a central vacuum line in a building is disclosed in Korean Utility Model Registration No. 20-0219405, and U.S. Pat. No. 5,370,728 also describes a VPSA process. Additionally, U.S. Pat. Nos. 5,266,102 and 5,656,067 each suggest a modified VSA process.

The reason why the VSA process is combined with the PSA process is that oxygen separation efficiency is improved and high purity oxygen is obtained. Meanwhile, it is reported that humans feel refreshed when an oxygen concentration in air is higher than in atmospheric air by ones of %, but oxygen with 90% or higher purity is rather harmful than good to humans. A conventional PSA oxygen separator generates highly pure oxygen of 80% or higher purity, and so direct use of the conventional PSA oxygen separator may cause problems such as fire or oxygen toxicity. Accordingly, it is preferable that a gas separation membrane process generating relatively low purity oxygen, or a modified PSA process generating low purity oxygen in a maximum quantity, instead of the conventional PSA process generating high purity oxygen such as medical oxygen, is applied to separate oxygen from air. Furthermore, when the VSA process having been applied to large-scale applicants is applied to small-scale oxygen separation processes, the VSA process may be preferably applied to automobiles in consideration of low purity oxygen generation.

Therefore, the present invention has been made keeping in mind the above disadvantages occurring in the prior art, and provides an air purification device with oxygen-supplying function according to the VSA process, a kind of the PSA process, in which oxygen enriched air is produced from air using a vacuum source in the automobile, or using a vacuum pump or an oil lubricated type vacuumizing device driven by an engine of the automobile, air in the automobile is sucked by a vacuum pump, the sucked air is purified by a dust collector or a filter such as activated carbon, oxygen enriched air is produced from air by an adsorbent such as zeolite, and the oxygen enriched air is supplied into the passenger compartment of the automobile. As described above, if only the VSA process is used to produce oxygen enriched air from air, oxygen separation efficiency is poor, and thus the VPSA process in which the VSA process is combined with the PSA process is frequently used. However, the air purification device according to the present invention is based on the VSA process using only vacuum because of various disadvantages of applying an air compressor to the automobile. Because the vacuum swing adsorption process is used to operate the air purification device, highly pure oxygen is not generated, thus preferably supplying air with an oxygen concentration not harmful to human health into the automobile.

According to the present invention, drivers and passengers of a car are refreshed because a desirable oxygen concentration of air is maintained in the automobile by sucking air in the automobile, purifying air, and supplying purified air with a desirable concentration of oxygen into the automobile.

Furthermore, the present invention provides a method of separating oxygen from air passing through an adsorbent, comprising the steps of releasing nitrogen adsorbed in the adsorbent such as zeolite using a vacuum pump and sucking air in the automobile into an adsorption bed vessel under vacuum.

SUMMARY OF THE INVENTION

Therefore, it is an object of the present invention to supply oxygen in conjunction with purified air into a room or into an automobile.

It is another object of the present invention to provide an air purification device for an automobile with oxygen-supplying function, which sucks air in the automobile to generate air with a desirable concentration of oxygen, and allows the resulting air to pass through a dust collector, zeolite, activated carbon, an antimicrobial filter, an anion generator, and a scent generator etc., thus allowing users in the automobile to feel refreshed.

It is another object of the present invention to prevent an adsorbent such as zeolite from adsorbing moisture due to a vapor condensation occurring when hot compressed air passing through an air compressor comes in contact with cool atmospheric air.

It is another object of the present invention to prevent a lubricant from containing compressed air when an oil lubricated type air compressor is used to overcome poor durability of the air compressor, by using a difference between low pressure due to a vacuum pump and atmospheric pressure.

It is another object of the present invention to provide an oil circulating vacuum pump of an oxygen supplier, driven by an automobile engine, having advantages of low noise, long life span, and high flux.

It is another object of the present invention to avoid disadvantages of a conventional pressure swing adsorption process such as vibration and noise without a high pressure safety device, a pressure controller, and a moisture separator.

It is another object of the present invention to avoid disadvantages of a pressure swing adsorption process by applying a vacuum swing adsorption process into an automobile.

It is another object of the present invention to provide a device for supplying air into an adsorption bed using a single vacuum source and releasing oxygen enriched air from the adsorption bed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
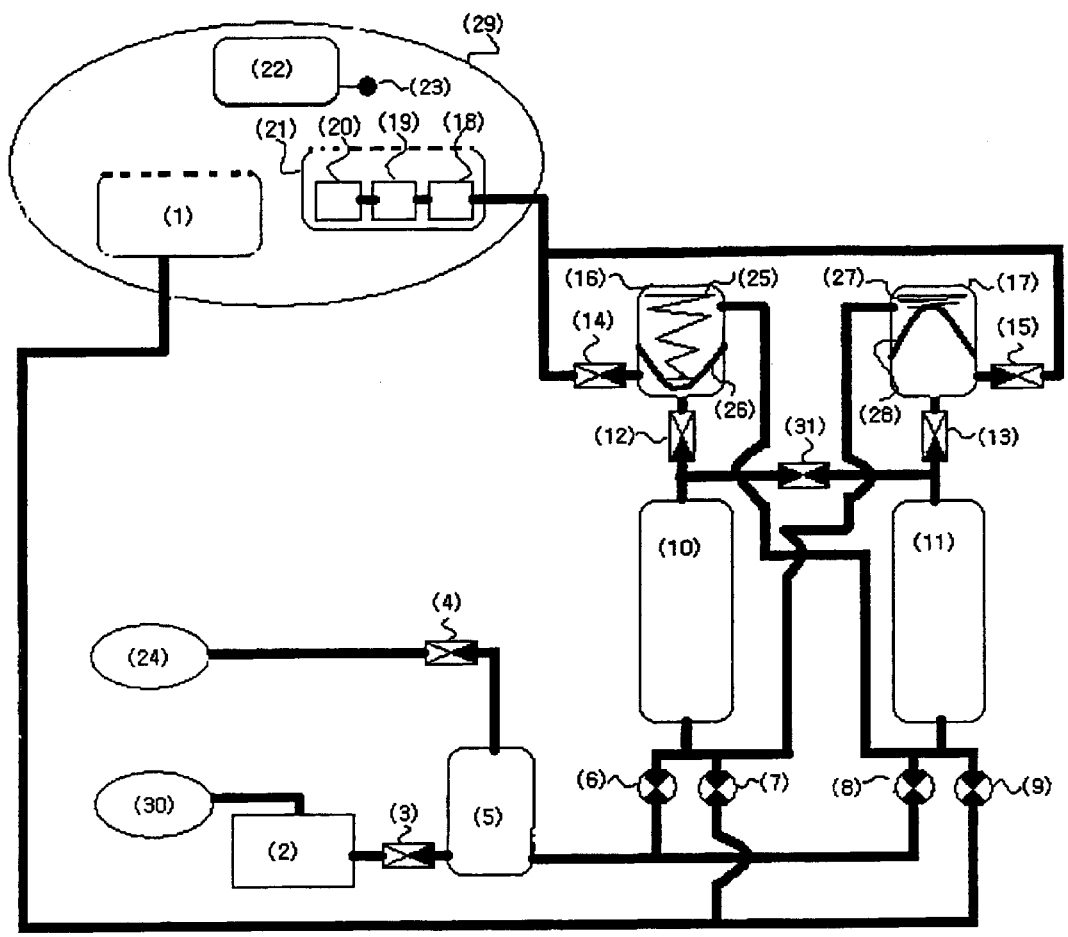
FIG. 1 is a flow diagram illustrating an air purification device for an automobile with oxygen-supplying function according to the present invention.

Based on the present invention, the object can be accomplished by a provision of an air purification device for an indoor air conditioner or an automobile with oxygen-supplying function, comprising an air filter for removing impurities, bacteria, and a bad smell from air in the automobile, a vacuum pump for sucking air passing through the air filter in a predetermined degree of vacuum, an adsorption bed having adsorbents, being able to increase oxygen concentration by adsorbing mostly nitrogen from air using the vacuum pump, a bypass flow rate controlling tube for improving nitrogen desorption efficiency of the adsorption bed, a first check valve allowing oxygen supplied from the adsorbent to flow in one direction, an oxygen tank for storing oxygen passing through the check valve, a pump means for supplying oxygen stored in the oxygen tank to an inside of the automobile, a second check valve for maintaining an inside of the oxygen tank under vacuum after releasing oxygen from the oxygen tank, a valve means for alternately applying vacuum and atmospheric pressure into the adsorption bed, a scent generator for supplying scent in conjunction with purified oxygen into the automobile or an anion generator for improving air quality in the automobile, a controller, and an oxygen sensor for measuring an amount of oxygen.

In the case of the automobile, it is preferable to use the vacuum pump driven by an automobile engine, and a separate vacuum pump may be used in combination with an intake manifold part or an intake manifold part may be used alone as a vacuum pump means. A separate small-sized vacuum pump or small-sized blower may be used to release oxygen under atmospheric pressure into the oxygen tank. According to an embodiment of the present invention, when two adsorption beds are used, it is preferable to use a simple spring and diaphragm so as to exploit a vacuum generated by the vacuum pump means, or a combination of a spring and a piston in a cylinder may be used.

In addition, the length of one cycle comprising a sucking and a releasing step depends on a capacity of the vacuum pump and a size of the adsorption bed. Accordingly, when two adsorption beds are used, the sucking and releasing step can be conducted within one second by using an optimized separate vacuum pump or a vacuum pump connected to an automobile engine. At this time, the vacuum pump is directly connected to a crank shaft or a pulley of the automobile engine. From tests conducted on the air purification device of the present invention, it was found that the whole cycle period is less than 5 seconds, and 25 to 35% pure oxygen can be generated in a great quantity by optimizing the cycling period of the vacuum pump against the adsorbent in the small-sized adsorption bed (length of 20 cm and inner diameter of 2.5 cm or shorter). In other words, it was found that purity of oxygen generated according to a conventional pressure swing process is low but its productivity is not reduced.

Moreover, a small amount of oxygen is bypassed through a bypass oxygen channel positioned on the adsorption bed so as to remove nitrogen from air, thereby increasing the purity of oxygen by 3% or higher.

The filter firstly purifying air absorbed from an inside of the automobile may comprise an air filter, a dust collector, activated carbon for removing a bad smell, and an antimicrobial filter according to need. Needless to say, suction of air from the automobile interior causes air outside of the automobile to be sucked inside because of incomplete airtightness of the automobile. This is equally applied to the case that an oxygen supplier absorbs air from outside of the automobile to supply oxygen enriched air into the automobile. Accordingly, in theory, additional outer air flows into the automobile by a pressure difference between air sucked from an inside of the automobile using the device of the present invention and oxygen enriched air supplied into the automobile using the device, and so it is preferable that air is sucked from an inside of the automobile so as to simultaneously achieve air purification and oxygen enrichment functions.

Furthermore, the air purification device may further comprise a flow rate controlling valve when the oxygen tank and the oxygen releasing pump are not optimized. The device may be individually provided with the oxygen tank and the oxygen releasing pump, or integrally provided with them using the same vacuum source.

Additionally, the check valve allowing oxygen supplied from the adsorbent to flow in one direction is connected to the adsorbent and the oxygen tank. At this time, if the check valve is replaced with an electrical valve, purity of oxygen can be controlled by a controller.

Two 2-way solenoid valves each having 3 ports or one 2-way solenoid valve having 5 ports may be used as the valve means, but if a motor rotary valve connecting channels to each other at predetermined time intervals by repeatedly conducting two types of vacuum-sucking process is used as the valve means, the pump means releasing oxygen can be additionally controlled by use of one rotary valve and disadvantages of the device such as noise and poor durability are avoided.

Meanwhile, when the motor rotary valve is used, the controller may be omitted, but it is preferable that the device comprises the controller for self-examination and automatic control.

In particular, the present invention is characterized in that a vacuum pressure in an intake manifold part of the automobile is utilized without a separate vacuum pump. The vacuum pressure in the intake manifold part of the automobile is 260 mm bar or less, thus being able to act as the vacuum pump means.

Reference should now be made to the drawings, in which the same reference numerals are used throughout the different drawings to designate the same or similar components. FIG. 1 is a flow diagram illustrating an air purification device with oxygen-supplying function according to the present invention.

With reference to FIG. 1, the device comprises an air filter 1, positioned at an air conditioner in an automobile or a room, for filtering impurities from air in the automobile or the room, a vacuum pump 2 for sucking air through a sucking poll 30 of the air filter in a predetermined degree of vacuum, a vacuum tank 5 connected to the vacuum pump 2 so as to maintain a desirable vacuum pressure, valves 6 to 9 for converting a vacuum pressure into an atmospheric pressure, adsorption beds 10 and 11 having an adsorbent for adsorbing nitrogen and passing through oxygen among components constituting air in the automobile, a bypass flow rate controlling valve 31 acting as an oxygen channel between adsorption beds, check valves 12 and 13 allowing oxygen supplied from the adsorption bed to flow in one direction, and oxygen tanks 16 and 17 for collecting oxygen enriched air. The oxygen tank is provided with a spring 25 or 27 and a diaphragm 26 or 28, and acts as an oxygen releasing pump for releasing oxygen from the oxygen tank into the automobile by use of a vacuum pressure of the vacuum pump 2. A separate vacuum pump may be used so as to release oxygen stored in the oxygen tank like prior arts. The air purification device further comprises check valves 14 and 15 allowing oxygen stored in the oxygen tank to flow in one direction, and oxygen enriched air passing through the check valve 14 or 15 is supplied through a releasing module 21 into the automobile. When the vacuum pump is separately used to release oxygen, the channel connecting the oxygen tank 16 or 17 to the valve is not needed. Additionally, the vacuum tank 5 may be omitted when the vacuum pressure is sufficiently created by the air purification device, and the oxygen tank 16 or 17 is selectively omitted if oxygen flux released from the oxygen tank is not needed to be constant in the case of using a separate vacuum pump to release oxygen. The valves 6 to 9 useful in the present invention are selected from the group consisting of a solenoid valve and a rotary valve driven by a motor. The releasing module 21 is selectively provided with an anion generator 18 or a scent generator 19 through which oxygen is released from the oxygen tank, and oxygen passing through the anion generator 18 or scent generator 19 is released through a duct 20 to an inside 29 of the automobile, thereby improving the atmosphere inside the automobile.

Furthermore, the air purification device selectively comprises an oxygen sensor 23, positioned in the automobile, for measuring an oxygen content of air in the automobile, and a controller 22 for controlling the oxygen sensor 23 according to the measured oxygen content. At this time, the controller 22 is provided with a part for inputting a command of a user.

An operation of the air purification device with oxygen-supplying function will be described, below.

Air sucked into the automobile passes through an air filter 1 by a vacuum pump 2, and two adsorption beds 10 and 11 each operate according to a vacuum and a suction cycle in such a way that each adsorption bed is reversely operated with respect to the other bed. As will be appreciated by those skilled in the art, two adsorption beds are used so as to continuously operate the air purification device, and may be extended to multi-bed systems to reduce a sucking period.

A detailed description of operation of adsorption beds will be given below, supposing that a first adsorption bed 10 is in a state of releasing air and a second adsorption bed 11 is in a state of sucking air.

When a low pressure state having vacuum effect of an automobile intake manifold part 24 and an alternative vacuum state created by a vacuum pump 2 are all at lower pressure than the vacuum tank 5, air is sucked through the check valve 3 or 4 from the vacuum tank to constantly maintain a vacuum in the vacuum tank 5.

When valves 6 and 9 are open and other valves 7 and 8 are closed, a pressure in a first adsorption bed 10 is reduced due to a low pressure in the vacuum tank 5, thus releasing nitrogen adsorbed onto an adsorbent in the first adsorption bed 10 into the vacuum tank 5 and allowing a small amount of oxygen separated from a second adsorption bed 11 to flow into the first adsorption bed 10, thereby assisting a desorption of nitrogen. On the other hand, the second adsorption bed 11 conducts an adsorption process while air passing through an air filter 1 flowing into the second adsorption bed 11. When the valve 9 is open, an inside of a first oxygen tank 16 is under atmospheric pressure, and so a spring 25 descends in the first oxygen tank 16 to lower a diaphragm 26 as in FIG. 1. Oxygen in the oxygen tank passes through the check valve 14 and may flow through an anion generator 18 or a scent generator 19 into the automobile.

Meanwhile, a second oxygen tank 17 is under vacuum when the valve 6 is open, and so a diaphragm 28 ascends in the second oxygen tank 17 to store oxygen enriched air supplied from the second adsorption bed 11. As described above, the oxygen tank 16 or 17 acting as a pump can release oxygen enriched air by separately using a small-sized vacuum pump or a small-sized blower. At this time, a channel connecting the oxygen tank to the valve is not needed.

The above procedure is repeated, in other words, the adsorption bed 10 or 11 repeatedly conducts a sucking and a releasing process to continuously generate oxygen enriched air. A plurality of adsorption beds can be parallely connected to each other in consideration of a capacity of the vacuum pump and productivity of oxygen.

Therefore, an air purification device of the present invention is advantageous in that the device sucks air in an automobile to generate oxygen enriched air, and allows the resulting air to pass through a dust collector, an adsorbent such as zeolite and activated carbon, an anion generator, and a scent generator etc., thus allowing users in the automobile to feel refreshed.

The air purification device prevents a driver from causing a car accident owing to sleepiness or an oxygen shortage.

An oxygen supplier of the present invention is advantageous in that heat is not generated, unlike when an air compressor is used, because of using an atmospheric pressure and a vacuum, thus needing no separate cooling equipment and overcoming vapor condensation and noise.

In addition, the present invention avoids disadvantages of an oil lubricated type pump, that is to say, contamination by a lubricant of air, by just sucking air in the automobile using a difference between vacuum pressure due to a vacuum pump and atmospheric pressure.

Further, the present invention can provide an oil circular vacuum pump of an oxygen supplier, driven by an automobile engine, having advantages of low noise, long life span, and high flux.

Furthermore, the device of the present invention has an advantage in that disadvantages of a conventional pressure swing adsorption process such as vibration and noise can be avoided without a high pressure safety device, a pressure controller, and a moisture separator.

Additionally, the present invention is advantageous in that an adsorbent is prevented from adsorbing moisture due to a vapor condensation occurring when hot compressed air passing through an air compressor comes in contact with cool atmospheric air in the case of using an air conditioner in combination with an oxygen supplier because air purification and oxygen generation is accomplished by only using a vacuum, thereby improving performance factor of the air purification device.

Moreover, the oil circulating type vacuum pump with excellent durability, driven by an automobile engine can be used as the vacuum pump of the oxygen supplier.

In addition, a high pressure safety device, a pressure controller, and a moisture separator needed in the conventional pressure swing adsorption process can be omitted by using only atmospheric and vacuum pressure, thereby providing a simple and light air purification device having advantages of low noise and semi-permanent expected life span.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An air purification device for an automobile with oxygen-supplying function, provided with a suction port and a releasing port for sucking air in the automobile and releasing air into the automobile, and a channel connecting the suction port to the releasing port, comprising:

an air filter, adjacent to the suction port, to remove impurities from air;

vacuum pump means for sucking air in the automobile;

two adsorption beds, connected to the air filter, for separating oxygen from air, said adsorption beds each containing an adsorbent mostly adsorbing nitrogen from air;

bypass channel means connecting the adsorption beds to each other, and allowing oxygen enriched air to flow from one adsorption bed to the other adsorption bed;

additional pump means for releasing the oxygen enriched air from the adsorption beds;

a check valve, connected to each of the adsorption beds and the additional pump means, thus allowing the oxygen enriched air to exclusively flow from the adsorption beds to the additional pump means; and valve means mounted on a channel connected to the two adsorption beds, the vacuum pump means, and the air filter to alternately allow a vacuum and atmospheric pressure to be applied into each adsorption bed, wherein said vacuum pump means is directly seated on the automobile and driven by an engine, each of said adsorption beds converts air sucked from an inside of the automobile into the oxygen enriched air to supply the oxygen enriched air into the automobile by the additional pump means, said air sucked from the inside of the automobile is thus converted into the oxygen enriched air by controlling the channel using the valve means to alternately apply the vacuum and atmospheric pressure into each adsorption bed using vacuum pressure generated from the vacuum pump means according to a vacuum swing adsorption process.

2. The air purification device according to claim 1, further comprising an oxygen tank, connected to the additional pump means and the check valve, for storing oxygen enriched air supplied from each of the adsorption beds.

3. The air purification device according to claim 2, wherein the oxygen tank releases oxygen enriched air by a spring and a diaphragm positioned therein, and said spring and diaphragm being operated by vacuum pressure supplied from the vacuum pump means.

4. The air purification device according to claim 1, further comprising a vacuum tank for vacuum preservation, connected to the valve means and the vacuum pump means.

5. The air purification device according to claim 2 or 4, wherein the vacuum pump means comprising an intake manifold part of the automobile.

6. The air purification device according to claim 5, further comprising a separate auxiliary vacuum pump, said intake manifold part of the automobile mostly acting as the vacuum pump means and said separate auxiliary vacuum pump additionally supplying a vacuum to the air purification device.

7. The air purification device according to claim 5, further comprising an oxygen sensor and a controller positioned in the automobile, said oxygen sensor measuring a concentration of oxygen in the automobile, said controller regulating an amount of generated oxygen according to a measured concentration value.

8. The air purification device according to claim 5, further comprising a scent generator or an anion generator for providing amenities to users, positioned at an oxygen discharge part for discharging oxygen enriched air into the automobile.

9. The air purification device according to claim 5, wherein said valve means for controlling the channel is a rotary valve driven by a motor.

10. The air purification device according to claim 5, wherein said additional pump means for releasing the oxygen enriched air is a small-sized vacuum pump driven by a motor.

11. The air purification device according to claim 2 or 4, wherein the vacuum pump means comprises an oil lubricated type vacuum pump, said vacuum pump being directly connected to a crank shaft or a pulley of an engine.

12. An air purification device for an automobile with oxygen-supplying function, provided with a suction port and a releasing port for sucking air in the automobile and releasing air into the automobiles and a first channel connecting the suction port to the releasing port, comprising:

an air filter, adjacent to the suction port, to remove impurities from air;

a first pump for sucking air in the automobile;

two adsorption beds, connected to the air filter, for separating oxygen from air, said adsorption beds each containing an adsorbent mostly adsorbing nitrogen from air;

a bypass channel connecting the adsorption beds to each other, and allowing oxygen enriched air to flow from one adsorption bed to the other adsorption bed;

a second pump for releasing the oxygen enriched air from the adsorption beds;

a check valve, connected to each of the adsorption beds and the second pump, thereby allowing the oxygen enriched air to exclusively flow from the adsorption beds to the second pump;

a valve mounted on a second channel connected to the two adsorption beds, the first pump, and the air filter to alternately allow a vacuum and atmospheric pressure to be applied into each adsorption bed, wherein said first pump is directly seated on the automobile and driven by an engine, each of said adsorption beds converts air sucked from an inside of the automobile in the oxygen enriched air to supply the oxygen enriched air into the automobile by the second pump, said air sucked from the inside of the automobile is thus converted into the oxygen enriched air by controlling the channel using the valve mounted on the channel to alternately apply the vacuum and atmospheric pressure into each adsorption bed using vacuum pressure generated from said first pump according to a vacuum swing adsorption process.

13. The air purification device according to claim 12, further comprising an oxygen tank, connected to the second pump and the check valve, for storing oxygen enriched air supplied from each of the adsorption beds.

* * * * *